Patented Aug. 6, 1940

2,210,326

UNITED STATES PATENT OFFICE 2,210,326

BONDING OF CALCIUM SILICATES

Norman Percy Pitt, Eastview, Ontario, and Ernest Grantham Baker, Kilmar, Quebec, Canada, assignors, by mesne assignments, to Canadian Refractories Limited, Montreal, Quebec, Canada, a corporation of Canada No Drawing. Application April 1, 1937, Serial No. 134,455

7 Claims. (Cl. 106—9)

This invention relates to the bonding of calcium silicates and more particularly to the bonding of refractories containing substantially non-hydrating calcium silicates.

The object of the invention is to provide a convenient and economical method of bonding materials of the character described, which will produce a bonded product substantially as strong unburned as burned and capable of retaining a substantial portion of its strength at all temperatures below that of incipient fusion. The invention is applicable to materials to be molded in place and for refractory cements as well as for brick. It contemplates an unburned mixture, which when molded or placed and dried has greatly increased strength, which is sufficiently hard to be handled readily without breakage, which has a high cold crushing strength and which retains the refractory and other desirable characteristics of the material of which it is made.

In carrying out the invention there is incorporated with a refractory material, containing substantially non-hydrating calcium silicate, a soluble inorganic bonding agent, which when the mixture is dried becomes practically insoluble. Normal sodium carbonate is the preferred bonding agent but soluble carbonates, bicarbonates, hydroxides, fluorides, sulphides, chromates and arsenates of the alkali metals may be used. The proportion of the bonding agent for practical application is from 0.5 to 10% of the material to be bonded but normally 1 to 3% is sufficient. The amount to be used depends upon the strength and other properties desired. Saturated solutions of the bonding agent produce higher strength than unsaturated solutions, but ordinarily the amount of bonding agent, used does not saturate the amount of water required to temper the mass. Indeed, an objection to the use of very concentrated solutions is that the bonded material is so dense that water cannot readily be expelled without cracking the material.

The invention is applicable to all refractory materials which contain a substantial proportion, say 20 to 25% or more, of substantially non-hydrating calcium silicate, that is a calcium silicate which is stabilized against hydration and dusting. The presence of a substantial proportion of such calcium silicates is essential. Aggregate such as coarse particles of calcium silicate or inert materials such as silica or chrome ores, may be incorporated in the material without destroying the bonding power of the binding agent and in such cases the calcium silicate binder content of the mixture may be as low as 3 or 4%.

Monocalcium silicate does not bond with these reagents, but clinkers containing dicalcium and tricalcium silicates, if stabilized against hydration and dusting, bond readily. Non-hydrating silicates having a lime to silica ratio of 1.4 to 5.0 form the essential constituent of materials to be bonded in accordance with the invention.

For example, in the preferred practice of the invention a dead-burned refractory, containing 25% or more of the stabilized calcium silicate, and crushed, to say, from 2.5 mm. to dust, is tempered in the ordinary wet pan with a sufficient quantity of water to permit molding and 1 to 2% of anhydrous sodium carbonate. The sodium carbonate may be added as solution in the tempering water or as finely divided solid with the water. When uniformly mixed to the proper consistency the mass may be molded, pressed and dried by any ordinary means and adapted for use as brick, molded in place material or refractory cement. While the inorganic binding agent may be used alone it is usually preferred to use with it a small quantity, say 1%, of an organic bonding material, such as dextrin or the concentrated residue from the evaporation of sulphite liquor. This addition facilitates molding of the material and permits use of less of the inorganic bonding agent, thus reducing the possibility of trouble from cracking.

Of the inorganic bonding agents mentioned sodium carbonate and potassium carbonate are preferred and although the latter is more expensive than the former, owing to the higher solubility of potassium carbonate it may be preferred where a relatively large quantity of the bonding agent is to be used with little water. In some cases, combinations of sodium and potassium carbonates may be used with advantage, owing to the degree of solubility of mixtures of the two salts.

While the reason for the peculiar effectiveness of these inorganic bonding agents with materials containing calcium silicate as described is not clearly understood, it may be stated that no such effect is obtained with materials containing magnesium silicate or serpentine without the stabilized calcium silicate. Not only is little strength developed on drying mixtures of such materials, but soaking them in water is sufficient to disintegrate the mass or to reduce its strength to to the point where it may be crumbled in the fingers. On the other hand products made in accordance with the invention may be completely immersed in water for months without any disintegration, or, after drying, any appreciable loss of strength. Brick possessing a cold crushing strength of 10,000 lbs. per sq. in. or more are readily produced by the invention.

We claim:

1. A method of bonding, without burning, materials containing non-hydrating calcium silicate having a lime to silica ratio between 1.4 and 5.0 which comprises mixing such material with water and a water-soluble bonding agent being one of a group of compounds consisting of the alkali metal carbonates, fluorides, sulphides, arsenates and hydroxides, whose negative radicles when combined exclusively with hydrogen are, in water, weak electrolytes, shaping the mass into any desired form and drying the same.

2. A method as defined in claim 1 wherein an organic binding agent is incorporated in the material together with the water and said inorganic binding agent.

3. A method of bonding without burning refractory materials which comprises tempering with water a finely divided mass of such material containing not substantially less than 20% of stabilized calcium silicate in which the lime to silica ratio is between 1.4 and 5.0, mixing therewith an alkali metal carbonate, shaping the mass to desired form and drying the same.

4. A method of preparing a hard and insoluble mass of refractory material which comprises mixing water with finely divided refractory material containing non-hydrating calcium silicate in which the lime to silica ratio is between 1.4 and 5.0, uniformly mixing therewith 1 to 2% of sodium carbonate, shaping the mass and drying the same.

5. A method of bonding without burning aggregate which comprises mixing with the aggregate water, a finely divided material containing non-hydrating and non-dusting calcium silicate in which the lime to silica ratio is between 1.4 and 5.0 and alkali metal carbonate, shaping the mass and drying the same.

6. A method as set forth in claim 3 wherein before final tempering and shaping of the finely divided mass a portion of relatively coarse aggregate of refractory material is incorporated therein.

7. A method of bonding, without burning, refractory materials containing not substantially less than 20% of stabilized dicalcium silicate which comprises introducing, into a mixture of particles of such material ranging in size from 2.5 mm. to dust, from 1 to 5% of sodium carbonate, tempering the mass with water, shaping it into any desired form and drying the same.

NORMAN PERCY PITT.
ERNEST GRANTHAM BAKER.